US010955055B2

(12) United States Patent
Evans et al.

(10) Patent No.: US 10,955,055 B2
(45) Date of Patent: *Mar. 23, 2021

(54) SPIRAL WOUND GASKET

(71) Applicant: Garlock Sealing Technologies, LLC, Palmyra, NY (US)

(72) Inventors: Wayne Evans, Palmyra, NY (US); Chad Yoder, Palmyra, NY (US); Sherwin Damdar, Palmyra, NY (US); Paul Jude Nichols, Palmyra, NY (US); Richard Lynn Dibble, Palmyra, NY (US)

(73) Assignee: Garlock Sealing Technologies, LLC, Palmyra, NY (US)

( * ) Notice: Subject to any disclaimer, the term of this patent is extended or adjusted under 35 U.S.C. 154(b) by 206 days.

This patent is subject to a terminal disclaimer.

(21) Appl. No.: 15/991,789

(22) Filed: May 29, 2018

(65) Prior Publication Data

US 2018/0274680 A1  Sep. 27, 2018

Related U.S. Application Data

(63) Continuation of application No. 13/645,320, filed on Oct. 4, 2012, now abandoned, which is a (Continued)

(51) Int. Cl.
*B29C 45/14* (2006.01)
*F16J 15/20* (2006.01)
(Continued)

(52) U.S. Cl.
CPC ......... *F16J 15/20* (2013.01); *B29C 45/14778* (2013.01); *F16J 15/125* (2013.01);
(Continued)

(58) Field of Classification Search
CPC . F16J 15/20; F16J 15/12; F16J 15/125; B29C 45/14; B29C 45/14778; B29C 43/027; Y10T 156/1002; B29L 2031/265
See application file for complete search history.

(56) References Cited

U.S. PATENT DOCUMENTS 2,597,976 A  5/1952  Cousins
3,158,526 A  11/1964  Farnam et al.
(Continued)

FOREIGN PATENT DOCUMENTS

CA  2018857 A  12/1990
EP  0402909 A1  12/1990
(Continued)

OTHER PUBLICATIONS

PTAB decision for U.S. Appl. No. 13/645,320 (Year: 2018).*
(Continued)

*Primary Examiner* — Alexander Usyatinsky
(74) *Attorney, Agent, or Firm* — Perkins Coie LLP

(57) ABSTRACT

A spiral wound gasket includes a resilient sealing element including spirally wound, alternating layers of metal banding and winding fill material that incorporates a significant quantity of talc with quantities of fiber and binder. Either or both of an outer guide ring and inner guide ring may extend from peripheral outer and inner surfaces of the sealing element. Embodiments of the gasket overlay one or both axial faces of the sealing element with a layer facing material that incorporates a significant quantity of talc with quantities of fiber and binder.

14 Claims, 5 Drawing Sheets

Related U.S. Application Data continuation-in-part of application No. 13/252,718, filed on Oct. 4, 2011, now Pat. No. 9,234,589, and a continuation-in-part of application No. 13/252,788, filed on Oct. 4, 2011, now Pat. No. 9,732,855.

(60) Provisional application No. 61/703,121, filed on Sep. 19, 2012.

(51) Int. Cl.
*F16J 15/12* (2006.01)
*B29L 31/26* (2006.01)
*B29C 43/02* (2006.01)

(52) U.S. Cl.
CPC ....... *B29C 43/027* (2013.01); *B29L 2031/265* (2013.01); *Y10T 156/1002* (2015.01)

(56) References Cited

U.S. PATENT DOCUMENTS

| | | | |
|---|---|---|---|
| 4,271,228 A | 6/1981 | Foster et al. | |
| 4,317,575 A | 3/1982 | Cavicchio | |
| 4,319,950 A | 3/1982 | Sznopek et al. | |
| 4,629,634 A | 12/1986 | Coughlan et al. | |
| 4,698,243 A | 10/1987 | Carl et al. | |
| 4,705,278 A | 11/1987 | Locacius et al. | |
| 4,748,075 A | 5/1988 | Beyer et al. | |
| 4,759,962 A | 7/1988 | Buecken et al. | |
| 4,786,670 A | 11/1988 | Tracy et al. | |
| 4,795,174 A | 1/1989 | Whitlow | |
| 4,834,279 A | 5/1989 | McDowell et al. | |
| 4,859,526 A | 8/1989 | Potepan et al. | |
| 4,913,951 A | 4/1990 | Pitolaj | |
| 4,990,544 A | 2/1991 | Asaumi et al. | |
| 5,000,824 A | 3/1991 | Gale et al. | |
| 5,106,790 A | 4/1992 | Hashimoto et al. | |
| 5,240,766 A | 8/1993 | Foster | |
| 5,272,198 A | 12/1993 | Kaminski et al. | |
| 5,298,549 A * | 3/1994 | Mecklenburg | C08K 3/346 524/445 |
| 5,437,767 A | 8/1995 | Halout et al. | |
| 5,472,995 A | 12/1995 | Kaminski et al. | |
| 5,511,797 A | 4/1996 | Nikirk et al. | |
| 5,527,599 A | 6/1996 | Hall et al. | |
| 5,603,513 A * | 2/1997 | Shekleton | F16J 15/102 277/650 |
| 5,615,897 A | 4/1997 | Akita | |
| 5,763,094 A * | 6/1998 | Amano | C08L 21/00 428/473.5 |
| 5,992,857 A | 11/1999 | Ueda et al. | |
| 6,117,556 A | 9/2000 | Tamaru et al. | |
| 6,398,224 B1 | 6/2002 | Erb et al. | |
| 6,399,204 B1 | 6/2002 | Shekleton et al. | |
| 6,505,839 B1 | 1/2003 | Nishimuro et al. | |
| 6,550,782 B2 | 4/2003 | Okazaki et al. | |
| 6,555,223 B2 | 4/2003 | Kubo | |
| 6,746,626 B2 | 6/2004 | Hayward et al. | |
| 7,056,250 B2 | 6/2006 | Burrowes et al. | |
| 7,104,546 B2 | 9/2006 | Bono, Jr. | |
| 7,229,516 B2 | 6/2007 | Busby et al. | |
| 2002/0000696 A1 | 1/2002 | Okazaki et al. | |
| 2002/0050692 A1 | 5/2002 | Nishimuro et al. | |
| 2004/0137302 A1 | 7/2004 | Gilman et al. | |
| 2006/0071431 A1 | 4/2006 | Corbett | |
| 2006/0100374 A1 | 5/2006 | Hamada et al. | |
| 2007/0014965 A1 | 1/2007 | Chodelka et al. | |
| 2007/0018412 A1 | 1/2007 | Bono, Jr. | |
| 2009/0001672 A1 | 1/2009 | Takahashi et al. | |
| 2009/0162672 A1 | 6/2009 | Dunn et al. | |
| 2011/0287677 A1 | 11/2011 | McManus et al. | |
| 2011/0293878 A1 | 12/2011 | McManus et al. | |
| 2012/0068415 A1 | 3/2012 | Deluca et al. | |

FOREIGN PATENT DOCUMENTS

| | | |
|---|---|---|
| EP | 0440116 A2 | 8/1991 |
| EP | 0511265 B1 | 6/1994 |
| EP | 0616003 A1 | 9/1994 |
| GB | 2020759 A | 11/1979 |
| GB | 2468373 A | 9/2010 |
| JP | 03044489 A | 2/1991 |
| JP | 2009-024887 A | 2/2009 |
| WO | WO942760 A1 | 2/1994 |
| WO | WO 2010/19946 * | 9/2014 |

OTHER PUBLICATIONS

Supplementary European Search Report and Search Opinion of European Patent Application No. 11783891.2 dated Jul. 10, 2014, 6 pages.

European Examination Report for Application No. EP 11 783 891.2 dated Mar. 1, 2016 (5 pages).

Extended European Search Report for Application No. EP 11 83 4847.3 dated Mar. 23, 2016 (26 pages).

International Search Report and Written Opinion dated Oct. 20, 2011 for Int. Appl No. PCT/US2011/024892, 8 pp.

International Search Report and Written Opinion dated Nov. 30, 2011 for Int. Appl. No. PCT/US2011/024897, 8 pp.

International Searching Authority: "Notification of Transmittal of the International Search Report and the Written Opinion of the International Searching Authority, or the Declaration", for International Application No. PCT/US2011/054743, dated May 2, 2012. 16 pages.

International Search Report and Written Opinion for International Application No. PCT/US2013/060729, dated Feb. 18, 2014; 8 pages.

* cited by examiner

SPIRAL WOUND GASKET

CROSS-REFERENCE TO RELATED PATENT APPLICATIONS

This patent application claims priority to: U.S. Provisional Patent Application No. 61/703,121, entitled "Spiral Wound Gasket," filed Sep. 19, 2012; U.S. patent application Ser. No. 13/252,718, entitled "Extreme Temperature Gasket and Method of Making the Same," filed on Oct. 4, 2011; and U.S. patent application Ser. No. 13/252,788, entitled "Extreme Temperature Gasket and Method of Making the Same," filed on Oct. 4, 2011. The contents of these applications are hereby incorporated by reference herein in their entirety.

BACKGROUND

Spiral wound gaskets are commonly used to provide a seal between opposing pipe flanges in assemblies used to transport a variety of liquids and gases at various pressures and temperatures. The spiral wound gaskets include a resilient sealing element, formed from alternating layers of a metal band and a winding fill material. In various applications, an outer guide ring, formed typically from carbon steel, extends radially from the sealing element and is dimensioned to prevent over-compression of the sealing element. Oftentimes, an inner guide ring, typically formed from carbon steel, extends radially inward from the inner periphery to prevent buckling.

A common differentiating factor among spiral wound gaskets is the type of winding fill materials used for different applications. The relatively soft winding fill material is usually the 'weakest' link in the gasket, especially as application temperatures rise. Examples of high temperature winding fill material include: asbestos; mica; vermiculite; and chemically or thermally exfoliated vermiculite (such as THERMICULITE). Commonly, these winding fill materials are brittle or dusty due to the fact that they lack organics to impart the elastic properties of lower temperature sealing materials, which tend to be more 'tacky' and stick together but can impart greater sealing characteristics and seal integrity.

When lower temperature winding fill materials are wound with the alternating layers of metal they sometimes extrude out from between the metal layers to form a layer of compressible material that helps to seal against an opposing flange face. A common lower temperature filler material for spiral wound gaskets is graphite. Graphite performs well in common applications for temperatures up to about 850° F., at which point it tends to oxidize and lose mass continuously. Graphite also cannot be used in media classified as strong oxidizers, such as molten salt. This detrimentally affects sealing ability of the gasket. Accordingly, graphite spiral wounds are not suitable for applications of continuous temperature above 850° F. in oxidizing atmospheres, or extended temperature forays above 900° F.

When higher temperature winding fill materials are wound they extrude in a similar manner to lower temperature fillers. There are two main issues with current high temperature winding fill materials. The extruded winding fill material commonly flakes off without forming a good sealing layer, or the filler formulation is designed to preserve the integrity of the gasket rather than to effectively seal the media. High fiber content winding fill material is an example of a material with high integrity, but poor sealability due to the filler formulation. Accordingly, most high temperature sealing materials fall short of their primary function of effectively sealing the target media. To exacerbate this issue, current spiral wound gaskets operate at elevated leak rates due to the poor sealing capability of high temperature fillers, and this reduces system efficiency, creates hot spots, and potentially is a health issue based on the application. A cost effective improvement in sealing effectiveness is desired by numerous industries utilizing spiral wound gaskets in high temperature applications.

SUMMARY

This Summary is provided to introduce a selection of concepts in a simplified form that are further described below in the Detailed Description. Neither this Summary, nor the foregoing Background, is intended to identify key aspects or essential aspects of the claimed subject matter. Moreover, this Summary is not intended for use as an aid in determining the scope of the claimed subject matter.

Embodiments of a spiral wound gasket include a resilient sealing element that includes spirally wound, alternating layers of metal banding and winding fill material. In some applications, the spiral wound gasket is provided as only including the sealing element. In other applications, embodiments of the spiral wound gasket will include an outer guide ring that extends radially outward from an outer periphery of the sealing element. Some embodiments of the spiral wound gasket will include an inner guide ring that extends radially inward from an inner periphery of the sealing element. Various applications of the spiral wound gasket may require the use of either or both of the outer guide ring and the inner guide ring.

The sealing element includes a resilient spiral core, which is made with elongate metal banding that is wound into a spiral of overlying turns. In some embodiments, the spiral winding of the metal banding positions adjacent turns of the metal banding in a spaced-apart relationship with one another to define a gap between the side portions of the metal banding. In various embodiments, the gap is at least substantially filled with the resilient winding fill material in alternate, overlapping relation with the metal banding.

Some embodiments of the winding fill material use talc as the inorganic filler in a range from 60% to 90% by weight. Inorganic fiber content for some such embodiments of the winding fill material is from 1% to 14% by weight. Similarly, organic binder content for embodiments of the winding fill material is from 1% to 8% by weight.

In other embodiments, the winding fill material includes submicron-sized talc particles that comprise 75 to 90 wt % of the winding fill material. The inorganic fiber can be from 5 to 20 wt % of the winding fill material 16 and can include silicic acid fiber. The binder can be a latex emulsion and can be present in the filler material in the range of from 1 to 5 wt % of the winding fill material. The winding fill material also can include additives, such as flocculant and defoamer. In some embodiments, the amount of organic material present in the winding fill material is limited to less than 5 wt % of the winding fill material.

In some embodiments, a method for manufacturing the winding fill material described above generally includes preparing a talc slurry, preparing a sheet slurry using the talc slurry, forming a pre-densified gasket sheet from the sheet slurry, and densifying the gasket sheet to form the winding fill material. Other methods of manufacturing the winding fill material are also disclosed herein.

Various embodiments of the spiral wound gasket include one or more layers of facing material that may be secured to one or both of the axial faces of the sealing element. In various embodiments, the layers of facing material may be secured with the axial faces with organic binders, such as one of various spray adhesives. However, other securement methods, including mechanical press fit and encapsulating are contemplated. Some embodiments use layers of facing material that are formed from the same material as the aforedescribed filler material.

In at least one embodiment, the spiral wound gasket includes a resilient sealing element that includes spirally wound, alternating layers of metal banding to define a resilient spiral core. However, no winding fill material is disposed between the layers of metal banding. In various applications, embodiments of the spiral wound gasket may use either, both, or neither of the outer guide ring and the inner guide ring. A layer of facing material may be secured to one or both of the axial faces of the sealing element.

These and other aspects of the present system and method will be apparent after consideration of the Detailed Description and Figures herein.

DRAWINGS

Non-limiting and non-exhaustive embodiments of the present invention, including the preferred embodiment, are described with reference to the following figures, wherein like reference numerals refer to like parts throughout the various views unless otherwise specified.

DETAILED DESCRIPTION

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense.

Figure 1:
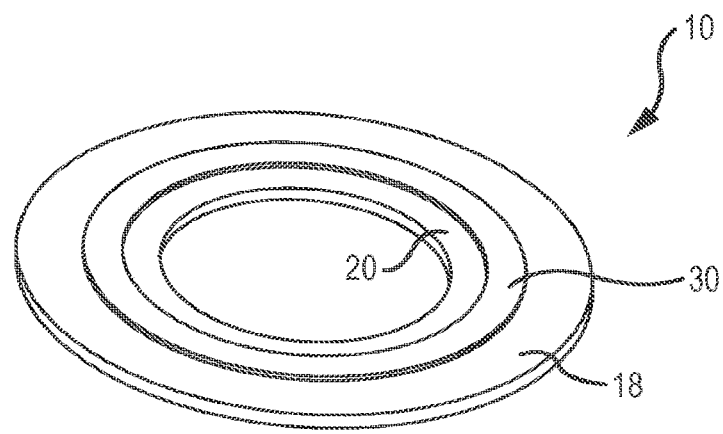
FIG. 1 depicts a perspective view of one embodiment of the spiral wound gasket of the present technology, wherein facing material is positioned
Figure 2:
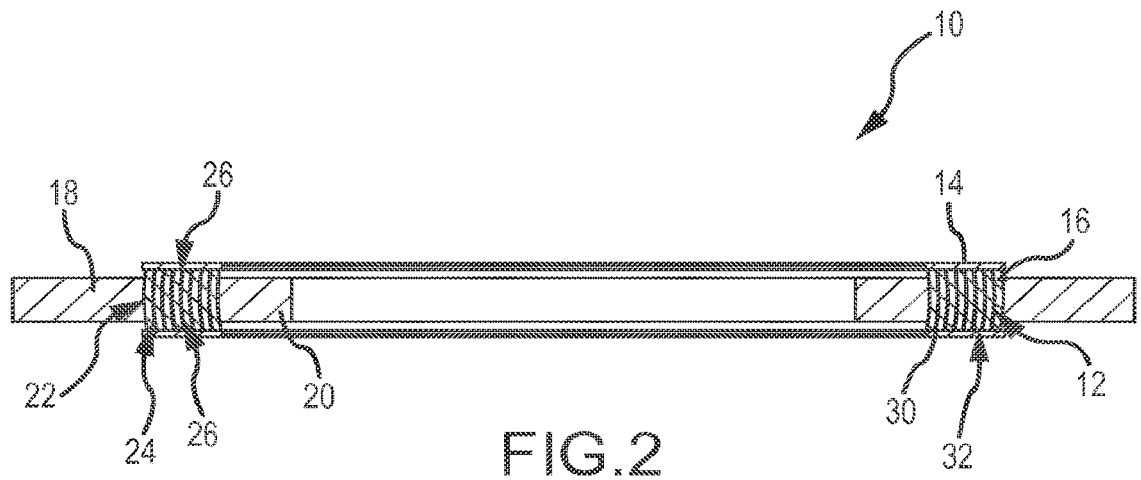
FIG. 2 depicts a cross-sectional view of the spiral wound gasket depicted in FIG. 1.
Figure 3:
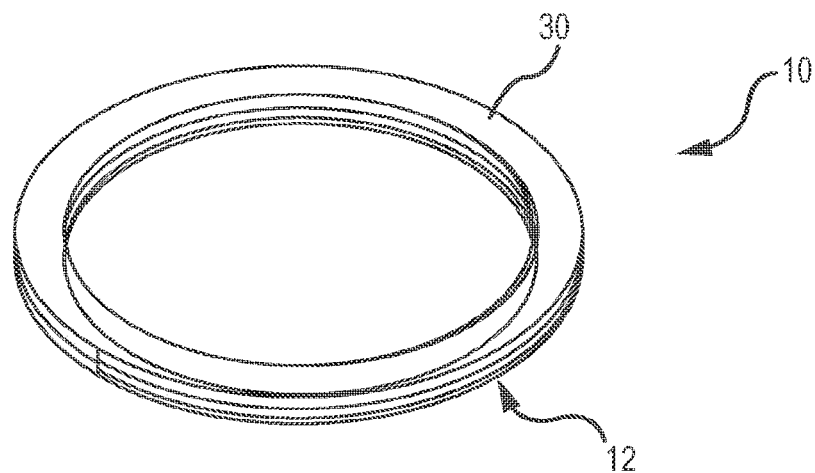
FIG. 3 depicts a perspective view of another embodiment of the spiral wound gasket of the present technology, wherein no inner or outer rings are positioned at the inner and outer peripheral surfaces of the gasket windings.
Figure 4:
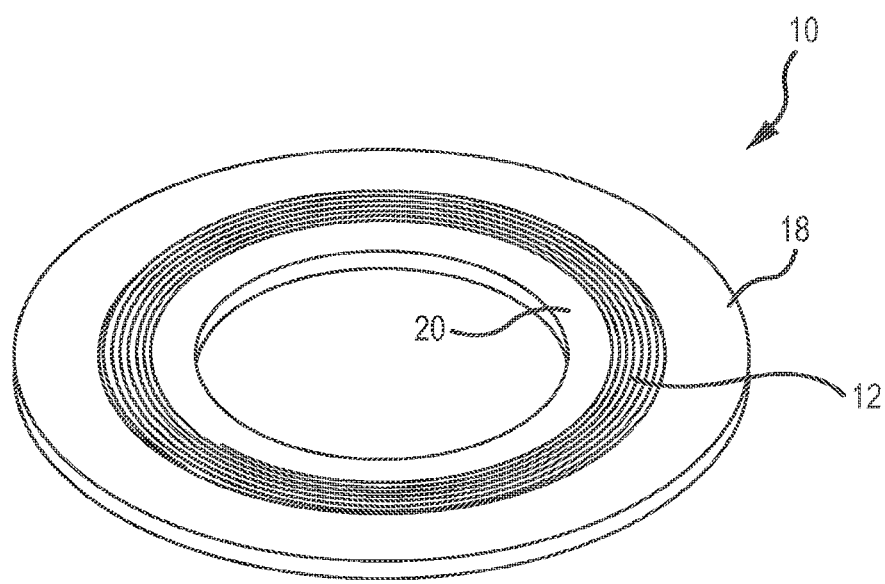
FIG. 4 depicts a perspective view of still another embodiment of the spiral wound gasket of the present technology, wherein no facing material is positioned at the opposing axial faces of the gasket windings.

With reference to FIGS. 1-4, embodiments of a spiral wound gasket 10 are depicted. Various embodiments of the spiral wound gasket 10 will include a resilient sealing element 12 that includes spirally wound, alternating layers of metal banding 14 and winding fill material 16. In some applications, such as depicted in FIG. 3, embodiments of the spiral wound gasket 10 are provided as only including the sealing element 12. In other applications, embodiments of the spiral wound gasket 10 will include an outer guide ring 18 that extends radially outward from an outer periphery of the sealing element sealing element 12. Some embodiments of the spiral wound gasket 10 will include an inner guide ring 20 that extends radially inward from an inner periphery of the sealing element 12. It is contemplated that various applications of the spiral wound gasket may require the use of either or both of the outer guide ring 18 and the inner guide ring 20. Regardless of the constituent components, the spiral wound gasket of the present technology may be provided in nearly any size and shape desirable for particular applications.

Various embodiments of sealing element 12 include resilient spiral core 15, which is made with elongate metal banding 14 that is wound into a spiral of overlying turns. In some embodiments, the metal banding 14 is shaped to include a medial crest 22 that defines a ridge in the metal banding 14 between opposing sides portions 20. The spiral winding of the metal banding 14 positions adjacent turns of the metal banding 14 in a spaced-apart relationship with one another to define a gap 24 between the side portions 26 of the metal banding 14. In the embodiment depicted in FIGS. 1 and 2, the thickness of the metal banding 14 is approximately 0.007 inches; however, the thickness of the metal banding 14 may range from about 0.006 inches to about 0.008 inches thick. The width of the metal banding 14 will vary according to the application. Various embodiments will use metal banding 14 that is formed from 316 stainless steel. However, other metal materials, such as Inconel, or other materials having higher temperature or chemical resistant metallurgies may be used, depending on the desired applications and manufacturing cost limits.

In various embodiments, the gap 24 is at least substantially filled with the resilient winding fill material 16 in alternate, overlapping relation with the metal banding. Depending on the desired application for the spiral wound gasket 10, the winding fill material 16 may be provided with various ratios of filler, fiber, and binder.

Generally, embodiments of the winding fill material 16 use talc as the inorganic filler in a range from 60% to 90% by weight. Inorganic fiber content for some such embodiments of the winding fill material 16 is from 1% to 14% by weight. Similarly, organic binder content for embodiments of the winding fill material 16 is from 1% to 8% by weight. Some embodiments of the winding fill material 16 may be provided to include greater than 60% by weight talc, less than 20% by weight inorganic fiber, and less than 5% by weight organic binder. Other embodiments of the winding fill material 16 include 75% to 90 wt % inorganic filler, 5% to 20 wt % inorganic fiber, and 1% to 5 wt % organic binder. In at least one embodiment, the winding fill material 16 is formed to include approximately 90% by weight talc, 7% by weight inorganic fiber, and 3% by weight organic binder. The winding fill materials can be manipulated in a manner consistent with cost effective manufacturing in order to keep the spiral wound gasket 10 competitively priced. The composition and ratio of raw material may be critically balanced to allow strips required for the spiral winding process to be manufactured.

The winding fill material 16 is capable of withstanding temperatures in excess of 850° F. The winding fill material 16 can handle temperatures above 850° F. at least in part because of the use of inorganic fiber and inorganic filler and the minimization of the amount of organic binder used. In so doing, the winding fill material 16 minimizes the leak passages that tend to form in a winding fill material 16 when organic material burns off at extreme temperatures. The winding fill material 16 also has improved sealant properties due to high filler content (typically provided at the expense of the fiber content). The filler material is a better sealant than the fiber material, and accordingly, the winding fill material 16 described herein has improved sealing capabilities.

The inorganic filler material is, in various embodiments, present in the winding fill material 16 in the range of from 75 to 90 wt %. As noted above, this high filler content improves the sealing properties of the winding fill material 16 over previously known winding fill materials having lower filler content. In some embodiments, the inorganic filler is a hydrophobic filler material. An exemplary hydrophobic filler material suitable for use in the winding fill material 16 described herein includes, but is not limited to, talc. Talc naturally repels water and provides for a better sealant, although the use of talc can also make forming the winding fill material more difficult. Talc is also a useful filler material for the winding fill material 16 described herein because it is a platy filler that orients itself in thin layers during the forming process, which provides good sealant properties. The talc used in embodiments described herein is typically a mined inorganic material and not a synthetic material.

In some embodiments, the hydrophobic inorganic filler is the only filler present in the winding fill material 16. In other embodiments, one or more hydrophilic fillers are used in conjunction with the hydrophobic filler. When hydrophillic fillers are used in conjunction with hydrophobic filler, it is preferable that the overall filler be substantially hydrophobic filler. Exemplary hydrophilic fillers that can be used with a hydrophobic filler include, but are not limited to, mica, fluorinated mica, vermiculite, and boron nitride. While the use of hydrophilic fillers can result in an easier process of making the winding fill material 16, the hydrophilic nature of these inorganic fillers also means the resulting winding fill material 16 will have an affinity to water and therefore have inferior sealing properties to winding fill material 16 formed with only hydrophobic filler.

In some embodiments, the filler material is preferably low particle size filler, such as submicron-sized filler particles. In some embodiments, the particle size of the inorganic filler material is in the range of 0.2 microns to 1.5 microns. The low particle size fillers can help to produce winding fill material having very few voids. In some embodiments, the inorganic filler material has a specific gravity in the range of from 2.7 to 2.8 g/cm$^3$.

Providing a winding fill material 16 having inorganic filler in the range of from 75 to 90 wt % differentiates the winding fill material 16 disclosed herein from some previously known winding fill materials. Applicants believe that including a high percentage of inorganic filler in a winding fill material is generally counterintuitive to those of ordinary skill in the art. For example, the inclusion of higher amounts of filler in winding fill materials is typically at the expense of the amount of fiber used in the winding fill material. However, those skilled in the art tend to disfavor reducing the fiber content of winding fill materials due to the associated decrease in winding fill material tensile strength. Additionally, when the filler material is a hydrophobic filler material, such as in the case of talc, the process of manufacturing the winding fill material becomes more difficult as higher amounts of filler are used. As noted herein, the hydrophobic talc filler material is difficult to wet and turn into a slurry that can be processed into sheet material. To avoid these processing difficulties, those of ordinary skill in the art have generally avoided using high amounts of hydrophobic filler material.

The inorganic fiber material is generally present in the winding fill material 16 in range of from 5 to 20 wt %. In some embodiments, the inorganic fiber material is a silicic acid fiber.

Examples of commercially available inorganic fibers that are suitable for use in the winding fill material 16 described herein include, but are not limited to, Nyad G, manufactured by Nyco Minerals of Willsboro, N.Y.; 3M Nextel Continuous Ceramic Oxide Fibers, manufactured by 3M of St. Paul, Minn.; and Insulfrax and Isofrax, manufactured by UniFrax of Niagra Falls, N.Y. The inorganic fiber can also be Wollastonite or Sepiolite. An Example of a commercially available silicic acid fibers that is suitable for use in the winding fill material 16 described herein includes, but is not limited to, Belcotex 225 SC 6 mm, manufactured by belChm of Freiburg, Germany.

In some embodiments, the inorganic fiber is preferably a fiber having no "shot," which is an undesirable non-fiber scrap byproduct produced during the manufacturing process of many ceramic fibers.

In some embodiments, the inorganic fiber material is provided in the form of individual segments having small dimensions. The inorganic fiber material suitable for use in the winding fill material 16 described herein can have a length of from 1 mm to 6 mm, and a diameter of from 3 microns to 12 microns. Fibers segments having a length below this range will have an unsuitably low tensile strength and poor sealing properties. Fiber segments having a length above this range may have improved tensile strength, but the resulting gaskets may have unsatisfactory leak rates. Use of fibers having a diameter below the 3 micron to 12 micron range presents safety issues, such as allowing for inhalation of fibers.

Alternative inorganic fibers that can be used in the winding fill material 16 include refractory ceramic fibers (RCF) and alkaline earth silicates. RCFs include kaolin clay-based blends of alumina and silica with metal oxides and high purity blends of silica and alumina. An example of a commercially available RCF suitable for use in the winding fill material 16 described herein is Fiberfrax bulk fiber, manufactured by Unifrax of Niagra Falls, N.Y. Alkaline earth silicates, also known as high-temperature glass wools, include amorphous fibers that are produced by melting combinations of CaO—, MgO—, $SiO_2$, and $ZrO_2$. An example of a commercially available alkaline earth silicate suitable for use in the winding fill material 16 described herein is Superwool bulk fibers, manufactured by Thermal Ceramics of August, Ga.

The organic binder is generally present in the winding fill material 16 in the range of from 1 wt % to 5 wt %. In some embodiments, the organic binder is latex. Exemplary latex emulsions suitable for use in the winding fill material 16 described herein include acrylics, nitrile elastomers, styrene butadiene rubber, ethylene vinyl acetate copolymers, and polyvinylidiene chloride. In some embodiments, nitrile elastomers are preferred. Suitable nitrile elastomers include nitrile butadiene rubber (NBR) or styrene butadiene rubber (SBR). An example of a commercially available nitrile elastomer suitable for use in the winding fill material 16 described herein is Nychem, manufactured by Emerald Performance Materials of Cuyahoga Falls, Ohio. An example of a commercially available NBR suitable for use in the winding fill material 16 described herein is Hycar 1572, manufactured by Lubrizol of Wickliffe, Ohio. An example of a commercially available SBR suitable for use in the winding fill material 16 described herein is GenFlo, manufactured by Omnova of Fairlawn, Ohio.

As noted above, the binder is an organic material, and the amount of organic material in the winding fill material 16 is limited to limit the burn off of organic material at extreme temperatures and the subsequent formation of leak paths. Accordingly, in some embodiments, the amount of organic material present in the winding fill material 16 is limited to no more than 5 wt %, and in some cases, no more than 3 wt %. While other previously known winding fill materials have limited the amount of organic material in recognition of this same problem, Applicants are unaware of any winding fill material that contains as low a quantity of organic material as in the winding fill material 16 disclosed herein.

In some embodiments, the winding fill material 16 further includes a flocculant. The flocculant aids in the formation of aggregates from individual particles. Flocculants generally include various molecular weight anionic, nonionic, or cationic polymers. The flocculants carry active groups with a charge that counterbalance the charge of the individual particles. Flocculants adsorb on particles and cause destabilization either by bridging or charge neutralization. In some embodiments, the flocculant used in the winding fill material 16 described herein is cationic because the binder and filler are anionic.

The flocculant used in the winding fill material 16 described herein can be from the polyacrylamide, polyethylene-imine, polyamides-amine, or polyamine group. In some embodiments, the preferred flocculant is a high molecular weight polyamine because the intrinsic flocculating power increases with molecular weight. An example of a commercially available flocculant suitable for use in the winding fill material 16 described herein is Superfloc, manufactured by Cytec of Woodland Park, N.J.

Another additive that can be included in the winding fill material 16 described herein is a defoamer. The defoamer is used to control foam formed after mixing together the binder, filler, and fibers but before the winding fill material sheet is formed. Without a defoamer, an inconsistent sheet can form because the density of the slurry will not be consistent when foam is present. In some embodiments, the defoamer is a water-based emulsion defoamer. Examples of defoamers suitable for use in the winding fill material 16 described herein include DF-450 manufactured by Chemco of Ferndale, Wash., and Nalco 600096 ANTIFOAM manufactured by Nalco of Naperville, Ill.

The winding fill material 16 described above can be difficult to form due to the components used and the amount of certain components used. Accordingly, in some embodiments, a method for manufacturing the winding fill material 16 described above is provided. The method generally includes preparing a talc slurry, preparing a sheet slurry using the talc slurry, forming a pre-densified gasket sheet from the sheet slurry, and densifying the gasket sheet to form the winding fill material 16.

The initial step of forming a talc slurry is carried out at least in part because the hydrophobic filler (e.g., talc) can be difficult to wet down. For example, if dry talc is added with the binder and fiber when preparing the sheet slurry, the talc may not completely wet down in the sheet slurry and may not be completely mixed into the sheet slurry. By first preparing a talc slurry, the talc will then mix sufficiently with the binder and fiber when preparing the sheet slurry.

Various parameters of the mixing step discussed below can be adjusted to prepare a talc slurry that is suitable for use in the method described herein. In some embodiments, certain parameters will require adjusting based on, for example, specific mixing equipment used. Examples of parameters that can be adjusted include: the shape and size of the mixing bowl; the number, shape and size of mixing blades; the number, shape, and size of baffles in the mixing bowl; mixing speeds; mixing times; mixer design (e.g., kettle, tumble, batch); and the amount of water used in the mixing step. Thus, specific details provided herein regarding parameters such as those listed above should be understood to be exemplary and capable of further modification and adjustment in order to prepare a suitable talc slurry.

In some embodiments, preparing the talc slurry generally includes adding the talc to water in stages and mixing the talc and water. For example, the total amount of talc required can be divided into two quantities, with the first quantity being added to a quantity of water and mixed for a period of time, followed by adding the second quantity of talc to the mixture formed from the first quantity of talc and water.

In some embodiments, talc is added to water while mixing, such as through the use of a mixing blade. Thus, in the above example, the first quantity of talc is added to the water while a mixing blade mixes the water, and the second quantity of talc is added to the mixture formed from the water and first quantity of talc while a mixing blade mixes the mixture. While described as batch processing, the mixing may be conducted by feeding a continuous amount of talc at a rate sufficient to allow complete mixing.

The mixing of the water and talc can be carried out in any suitable mixing device, such as an industrial mixer. In some embodiments, a quantity of water is added to the mixing bowl of an industrial mixer, and the mixing blade is turned on. A first quantity of talc is then added into the mixing bowl while the mixing blade operates to mix the water and the talc being added into the mixing bowl. Mixing the first quantity of talc is carried out for a period of time, which may be for as little time as about 1 minute, followed by the addition of a further quantity of talc and further mixing. In some embodiments, the mixing is carried out at a reduced speed until all of the talc has been added, at which time the speed of the mixing is increased.

After the desired amount of talc is added to the water and mixing commences, additional steps may be taken to wet dry talc that adheres to the side of the mixing bowl or the mixing blade. In some embodiments, the mixing device includes a sprayer that is capable of spraying water at the sides of the mixing bowl and the mixing blade to wash off any dry talc adhered thereto and add the talc to the slurry forming in the mixing bowl. In some embodiments, these spraying steps occur while the mixing continues to take place. Multiple spraying steps can be carried out during the mixing process. For example, a first spraying step can occur after all of the talc has been added to the mixing bowl, followed by mixing for a period of time, such as 30 minutes to 1 hour, and then another spray step can be carried out before mixing the slurry for an additional period of time, such as 45 minutes to 90 minutes. In some embodiments, the speed of the mixing blade is reduced after the second spraying step, such that the mixing that occurs after the second spraying step is carried out a slower mixing speed then the mixing speed after the first spraying step. Notice the times provided herein should not be considered limiting, but rather, exemplary.

Generally speaking, the talc slurry formed in the above step will be from 10 wt % to 40 wt % talc and from 60 wt % to 90 wt % water. The entire mixing process can take place over a period of time ranging from 5 to 150 minutes, for example. The longest periods of mixing take place between spray steps and after the final spray step. The mixing blade is generally started at half speed and increases from half speed to full speed after all of the talc has been added to the mixing bowl. The speed may then be reduced from full speed to half speed after the final spray step has occurred. Once the mixing has occurred and the talc slurry is formed, the mixing blade can be turned off and the talc slurry can be removed from the mixing device.

In other, less preferred, embodiments, a separate talc slurry is not prepared prior to introducing the fiber and binder into the slurry. Rather, the talc, fiber, and binder all mixed together at once with a quantity of water. In some embodiments, the slurry is from 97% to 99.8% water and from 0.2% to 3% solids material, with the solids material component of the slurry being from 85% to 95% talc, from 6% to 9% fiber, and from 2% to 5% binder. Advantages of preparing a single slurry of talc, fiber, and binder include only having to have one set of mixing equipment and less transfer equipment since there is no need to transfer talc slurry from one tank to another, while disadvantages include inconsistent mixing of the slurry (vigorous mixing is required to mix the hydrophobic talc, but also causes the fiber to clump).

In the next step of the process of making the winding fill material 16, a sheet slurry is formed using the talc slurry and the other components of the winding fill material 16. Generally speaking, the sheet slurry is formed by adding fiber to water and mixing for a period of time, adding the talc slurry to the mixture of water and fiber, adding the binder to the mixture, and optionally adding any additives, such as flocculant and defoamer. As noted above, adjustment of various mixing parameters can be carried out to ensure proper mixing.

The preparation of the sheet slurry generally begins by mixing fiber and water. This step is performed first because the fiber disperses better in the water when no other solids (such as the binder) are present in the water. The mixing of the fiber and water can be carried out in a similar manner as the mixing of talc and water described above. An industrial mixer can be used, in which case the water is added to the mixing bowl, the mixing blade is started, and the fiber is mixed in with the water as the mixing blade operates. In some embodiments, the mixing blade will be operated at full speed (e.g., 40 Hz) when the fiber is added to the mixing bowl to mix with the water. The mixing of the fiber and water can take place for a relatively short period of time, such as for about 30 seconds to 10 minutes. The mixture of fiber and water generally includes from 0.01 wt % to 5 wt % fiber and from 95 wt % to 99.99 wt % water. In some embodiments, the mixture is 0.03 wt % fiber and 99.97 wt % water.

In some embodiments, the mixing is temporarily stopped after the initial mixing of the fiber and water. This may be due to clumping of the fiber that occurs during the initial mixing step. Accordingly, the mixing can be stopped in order to declump the fiber. Any technique suitable for declumping the fiber can be used, such as use of water spray. After declumping has occurred, the mixing blade can be started again and run for an additional period of time. In some embodiments, the mixing is brought back up to full speed after recommencing mixing and the post-declumping mixing of the fiber and water is carried out for about 1 to 10 minutes. Following the mixing of the fiber and water, the talc slurry is added to the mixture of fiber and water. The talc slurry is added to the mixture while mixing continues at full speed, although less than full mixing speed is possible. Once the talc slurry is added, the mixing may be carried out for about 3 to 20 minutes. In some embodiments, it may be useful to raise the level of the mixing blade after the talc slurry has been added.

In the next step, the binder is added to the mixture. Prior to adding the binder to the mixture, the speed of the mixing blade may be decreased to, for example, about half speed (e.g., 20 Hz). Generally speaking, the mixing blade speed should be reduced to 30 Hz or below. If mixing continues at full speed when the binder is added, or even at greater than about 30 Hz, the binder tends to foam up. Accordingly, slowing the speed of the mixing blade so that the binder is blended in to the mixture rather than mixed into the mixture can prevent foaming. In some embodiments, the mixture of water, fiber, talc slurry and binder is mixed for a relatively short period of time before adding the next component of the sheet slurry, such as for about 10 to 90 seconds.

After the fiber, talc slurry, and binder have been added together to form a slurry, additives such as the flocculant and defoamer can be added into the slurry. The additives can be added in any order. In some embodiments, flocculant is added before defoamer. The additives are added while the mixing blade operates at half speed. A relatively short period of time follows the addition of each additive, such as 0.5 minutes of mixing following the addition of flocculant and 0.5 minutes of mixing following the addition of defoamer.

After the formation of the sheet slurry, a pre-densified gasket sheet is formed from the sheet slurry. The pre-densified gasket sheet can be prepared using a non-woven sheet former specifically designed for forming sheets from the sheet slurry described above. The non-woven sheet former can generally include three sections: an upper section, a filter media, and a lower section. The upper section and the lower section generally enclose the filter media, and in some embodiments the lower section is stationary while the upper section can be separated from the lower section to, for example, access the filter media. The overall shape and size of the non-woven sheet former is not limited, and can be varied based on the desired size and shape of the sheet to be formed by the non-woven sheet former. In some embodiments, the shape of the non-woven sheet former is generally rectangular to thereby form rectangular sheets.

In some embodiments, water is introduced into the non-woven sheet former prior to adding the sheet slurry. The water, such as, for example, about 3 to 4 inches of water, can serve as a cushion for the slurry being pumped into the non-woven sheet former. Without the water cushion, fiber clumps can form when the slurry contacts the filter media. In some embodiments, the level of water in the non-woven sheet former is higher than the filter media. The sheet slurry can rest on top of the water, and as the water is drained out of the non-woven sheet former, the sheet slurry lowers on top of the filter media.

The filter media located in the enclosed space between the upper portion and lower portion of the non-woven sheet former can generally include a screen and filter paper positioned on top of the screen. The filter media partitions the enclosed space into an upper portion and a lower portion. The slurry deposited into the non-woven sheet former will rest on top of the filter paper and screen, as the slurry is too thick to pass through. In some embodiments, the filter paper remains with the pre-densified sheet formed in the non-woven sheet former to provide additional structural support to the pre-densified sheet when it is removed from the non-woven sheet former. The mesh size of the filter media can be selected to allow water to pass through the filter media but to prevent the passage of the sheet slurry through the filter media. The mesh size of the filter media also can be selected to prevent the passage of both the filler and the fiber in the sheet slurry through the filter media. If the mesh size of the filter media is such that filler can pass through, the fiber content of the pre-densified sheet formed on the filter media will be too high.

The lower portion of the non-woven sheet former can be stationary and generally includes a drain and vacuum pump to pull water located in the upper portion of the enclosed space down through the filter media and out of the non-woven sheet former. Removing the water through the drain and via the use of the vacuum pump results in the formation of the pre-densified gasket sheet.

Prior to removing water through the drain of the lower portion, the sheet slurry deposited on the filter media is dispersed evenly on the filter media. A disperser paddle can be used to accomplish this, and the result is an evenly distributed layer of sheet slurry on the filter media. In some embodiments, the disperser paddle is a plunger. The sheet slurry that is transferred into the non-woven sheet former tends to enter into the non-woven sheet former in a swirling manner. By plunging the plunger into the deposited slurry, the swirling action is stopped and the slurry disperses evenly on top of the filter media.

After the sheet slurry is evenly dispersed in the non-woven sheet former, the drain in the lower section is opened to begin the removal of water from inside the non-woven sheet former. Water above the filter media is capable of passing through the filter media, and therefore opening the drain leads to water above the filter media passing through the filter media and out of the drain in the lower section of the non-woven sheet former. In some embodiments, the drain is opened for a relatively short period of time to allow water to flow out of the lower section, such as for 0.5 minutes. Following draining of water, the vacuum pump can be turned on to further remove water from inside of the non-woven sheet former and form the pre-densified sheet. In some embodiments, the vacuum pump is operated for about 4 minutes.

After water has been sufficiently removed from the non-woven sheet former and the pre-densified sheet is formed, the pre-densified sheet can be removed from the non-woven sheet former. The upper portion can be raised to allow for the pre-densified sheet to be removed. As noted above, the pre-densified sheet can be removed with the filter paper still attached to the sheet in order to provide support to the pre-densified sheet.

Various characteristics of the pre-densified sheet formation step described above can be adjusted based on a variety of factors, such as the specific materials being used and prior processing steps. Examples of parts of the pre-densified sheet formation step that can be adjusted include, but are not limited to, the type of filter media used, the method of adding the slurry into the non-woven sheet former, the method of dispersing the slurry within the non-woven sheet former, and the amount of water removed from the non-woven sheet former prior to removing the pre-densified sheet.

A final step in the method of making the winding fill material 16 involves densifying the sheet. Densifying generally includes applying heat and pressure to the pre-densified sheet. In some embodiments, a hydraulic press is used to densify the sheet. Heat can be applied in a range of from 300 to 400° F., and the pressure can be applied in a range of from 700 psi to 800 psi. The application of heat and pressure can be carried out for around 7 to 10 minutes, and the finished densified product can have a density in the range of from 85 to 95 ft/lb$^2$. In some embodiments, a release film is placed on the top and/or bottom of the sheet prior to densification. The release film can be, for example, PET coated with silicone. Densification can also be carried out via calendaring. Densification can be carried out on a continuous or batch basis.

In some embodiments, the process of manufacturing the winding fill material 16 is a continuous process, such a continuous wet lay process. The continuous wet lay process is similar to traditional paper making processes that use a Fourdrinier machine.

The continuous wet lay process can begin with the preparation of a sheet slurry. The preparation of the gasket sleet slurry can be similar or identical to the sheet slurry preparation steps described above in greater detail. In some embodiments, the sheet slurry can be prepared by first preparing a talc slurry, followed by adding the fiber and binder to the talc slurry to produce the sheet slurry. Alternatively, the talc, fiber, and binder and be mixed together at the same time with water to create the sheet slurry.

In some embodiments, including those where the sheet slurry is prepared as described in greater detail above, the sheet slurry provided at the beginning of the continuous wet lay process will include from 2% to 5% solid material. In such embodiments, an initial step of diluting the sheet slurry is carried out in order to reduce the solid content of the sheet slurry to within the range of from 0.5% to 3%. Diluting the sheet slurry can be performed by adding a further amount of water to the sheet slurry. In some embodiments, this dilution step can take place in the headbox of a Fourdrinier machine. It is preferable to dilute the sheet slurry to within this range of solid material because excessive solid content will result in winding fill material 16 that is too wet and thick. It is also preferred not to dilute the sheet slurry below 0.5% solid material because too high a water content will result in the winding fill material 16 being thin and weak.

In a next step of the continuous wet lay process, the diluted sheet slurry is continuously transferred onto a continuously running wire mesh conveyor belt. Any suitable manner of transferring the diluted sheet slurry onto the wire mesh conveyor belt can be used, although it is preferable that the manner of transferring the diluted sheet slurry provide for a generally uniform distribution of diluted sheet slurry on to the wire mesh conveyor belt. In some embodiments, a Fourdrinier machine will include the appropriate mechanism for transferring the diluted sheet slurry from the headbox to the wire mesh conveyor belt.

The mesh size of the wire mesh conveyor belt is a parameter of the process that can be adjusted to alter the characteristics of the gasketing material produced by the continuous wet lay process. In some embodiments, the mesh size of the wire mesh conveyor belt is in the range of from 24 to 32 (number of openings per square inch in both the vertical and horizontal direction). When the mesh size is larger, the slurry may be capable of falling through the conveyor belt. When the mesh size is smaller, the removal of water from the slurry in later processing steps may be inhibited.

The speed at which the conveyor belt travels is another parameter of the process that can be adjusted to alter the characteristics of the gasketing material produced by the continuous wet lay process. In some embodiments, the conveyor belt is operated at a speed in the range of from 2 ft/min to 5 ft/min. Speeds outside of this range may remove excessive amounts of water from the slurry (such as when the speed is lower than this range), or may remove insufficient amounts of water from the slurry (such as when the speed is higher than this range).

The wire mesh conveyor belt travels over one or more suction boxes, which operate to pull water down and out of the diluted sheet slurry being carried by the conveyor belt. Any suction boxes use a mild vacuum to pull the water down through the wire mesh conveyor belt. Any suitable number of suction boxes can be used, and the suction boxes can be located under the entire length of the conveyor belt.

After or while the conveyor belt exposes the diluted sheet slurry to the suction boxes, the conveyor belt passes the sheet slurry through a press section, which acts to remove additional water from the slurry while also flattening and smoothing the slurry. The press section can include one or more rollers through which the conveyor belt passes. When a Fourdrinier machine is used, the pressing can be accomplished with the use of a Dandy roll.

After a pressing step, the slurry is carried by the conveyor belt through a drying zone, which aims to reduce the water content of the slurry down to about 5%. The drying zone may include steam heated rollers. In some embodiments, the steam heated rollers are heated to a temperature of between 400 and 500° F.

After the pressing step, the slurry may be sufficiently dried and altered such that the winding fill material 16 is formed. Various additional processing steps can be carried out to further finalize the formation of the winding fill material 16. One such processing step is the calendaring of the material on the wire mesh conveyor belt. Calendaring can include passing the conveyor belt having the sheet material disposed thereon through a series of rollers in order to smooth the material and provide the material with a more uniform thickness.

In some embodiments, the wire mesh conveyor described above is positioned at an incline of from 15° to 35° in order to improve the removal of water from the slurry. When the conveyor is positioned at an incline, the a portion of the water content of the slurry remains in behind while the slurry travels upward to be exposed to the various process steps described above, including drying via suction boxes and heated rollers and pressing the slurry material.

Some variations to the above described wet lay process can be made to accommodate for the special characteristics of the sheet slurry. For example, the drainage steps can be increased, such as by increasing the vacuum pressures traditionally applied. In some embodiments, the wire mesh conveyor provides more support than is provided in traditional non-woven paper making processes due to the lower than normal wet tensile strength of the pre-densified sheets. Additionally, throughput dryers can be used in place of canister dryers. The throughput dryers can be preferable due to the lower than normal wet tensile strength of the pre-densified sheets.

In still other embodiments for manufacturing the winding fill material 16, a discreet method uses molds to form sheets of various shapes and sizes. The discreet method can be similar to traditional pulp molding processes used in the paper making industry. The sheet slurry described above can be sucked into fine-mesh screens having various shapes and configurations, followed by removing and drying the slurry shaped by the screens. In some embodiments, the sheet slurry is slightly modified when a discreet method is used. For example, the latex binder can be substituted with a solvent-based elastomer.

Extrusion processing also can be used to manufacture the winding fill material 16 described herein. In such processes, traditional extrusion apparatus used in ceramics are used to force the sheet slurry through a die and create shaped winding fill material 16. As with the discreet methods, the latex binder in the sheet slurry can be replaced with solvent-based elastomer when using an extrusion process to form the winding fill material 16.

In some embodiments, the winding fill material 16 is made using a process similar or identical to a silk screen process. Generally speaking, the process involves providing the sheet slurry (possibly in a thicker consistency) and spreading the sheet slurry over a hole having a specified shape. The slurry will fill the shaped hole and can then be treated further to form a gasket having the shape of the hole.

In some embodiments, the winding fill material 16 is made using a process similar to injection molding processes. Discrete winding fill material 16 is made by preparing a paste instead of a slurry. Generally, a paste can be prepared by using less water in the slurry preparation steps described above. The paste is pushed into a heated barrel after which it is augured into a heated mold using, for example, a screw-type plunger. Once the cavity of the mold is filled, the holding pressure is maintained to compensate for the evaporation of water.

In some embodiments, the winding fill material 16 is made from a compression molding process. In such a process, sheet slurry is packed in the negative section of a die, heated in an oven, and then pressed at an elevated temperature and pressure using the positive section of the die. The result is winding fill material 16 having the shape of the die used in the compression molding process.

The slurry packed in the negative section of the die can be similar or identical to the sheet slurry described in greater detail above, and can also be prepared according to the slurry preparation steps provided above. In some embodiments, the slurry is drained prior to being disposed in the negative section of the die. Draining the slurry can include placing the slurry on a mesh screen to allow water to drain down and out of the slurry for a period of time. Any mesh screen capable of allowing water but not the slurry to fall through the screen can be used.

The manner of disposing the slurry material into the negative section of the die is not limited, and can include either pouring the slurry into the die with no compression or packing steps, or pouring the slurry into the die followed by packing down the slurry and optionally adding additional slurry into the negative section of the die. In some embodiments, the amount of slurry disposed in the negative section of the die is an amount less than will fill the entire cavity of the negative section of the die.

Any die suitable for use in compression molding of winding fill material 16 slurry can be used. The die can be made from, for example, stainless steel. The shape of the die is not limited, and can be selected based on the equipment with which the resulting gasket will be used. In some embodiments, the die will have an elongate configuration to thereby produce strip shaped-gaskets.

After the slurry is disposed in the negative section of the die, a heating step is carried out. The die can be an oven and exposed to elevated temperatures for a period of time. In some embodiments, the elevated temperature is in the range of from 200° to 250° F. (preferably 212° F.). In some embodiments, the die is in the oven for a period of from 1 to 3 hours (preferably 2 hours). The heating step works to further remove water from the slurry and move towards the creation of a gasket sheet material.

Following the heating step, the positive section of the die can be inserted into the negative section of the die to apply pressure on the winding fill material 16 inside the negative section of the die. The pressure applied by the positive section can be in the range of from 700 psi to 900 psi (preferably 750 psi). Elevated temperatures can also be applied during this step, including by providing heat through the positive section of the die. In some embodiments, the application of pressure is carried out at temperatures in the range of from 250 to 350° F. (preferably 300° F.).

Following the application of pressure and heat, winding fill material 16 in the shape of the die will be formed. The winding fill material 16 will have a density that is about double the density of the pre-molded material. The winding fill material 16 can be removed from the die and subjected to any final processing steps, such as further shaping or smoothing of the winding fill material 16.

In one method of assembly sheets of the winding fill material are slit (or otherwise formed as described above) into elongated strips. The strips may be dimensioned to accommodate the particular parameters of the desired spiral wound gasket 10. In one particular embodiment, the winding fill material 16 is formed into 0.12 inch strips that are approximately 8 feet long. The strips of winding fill material 16 are positioned against lengths of the metal banding 14. In at least one embodiment, the thickness of the metal banding 14 is approximately 0.007 inches; however, the thickness of the metal banding 14 may range from about 0.006 inches to about 0.008 inches thick. The width of the metal banding 14 will vary according to the application. The metal banding 14 and winding fill material 16 are wound around a form or mandrel that is dimensioned to produce the desired diameter spiral in the overlying turns of the resilient spiral core 15. In various embodiments, the first two windings are spot welded around the circumference. Some embodiments will employ a minimum of three spot welds, which are not separated by more than 3 inches. Similarly, the outside diameter may be spot welded with three welds. The last weld will be the terminal weld. The distance from the terminal weld to the first weld, in some embodiments, will be no more than 1.5 inches.

Various embodiments of the spiral wound gasket 10 may be provided with either or both of an outer guide ring 18 and an inner guide ring 20. With reference to FIG. 2, embodiments of the spiral wound gasket 10 couple the outer guide ring 18 with the outer periphery of the sealing element 12. In some embodiments, the structures may be coupled with an interference fit. In other embodiments, the structures may be coupled to one another using other mechanical connection methods, including slotted joints. An inner guide ring 20 may be provided to extend radially inward from an inner periphery of the sealing element 12 and coupled therewith in a manner similar to the connection between the outer guide ring 18 and the outer periphery of the sealing element sealing element 12. In the embodiments such as that depicted in FIGS. 1 and 2, the thickness of the outer guide ring is typically provided between approximately 0.117 inches and 0.131 inches; however, the thickness of the outer guide ring 18 may be provided according to the parameters of the chosen application. Similarly, the depicted spiral wound gasket 10 includes an inner guide ring 20 with a thickness of between approximately 0.117 inches and 0.131 inches; however, the thickness may be provided according to the parameters of the chosen application. The thickness of either or both of the outer guide ring 18 and inner guide ring 20 will be dictated by the thickness of the metal banding 14 and the degree of over-compression protection desired. The width of either or both of the outer guide ring 18 and inner guide ring 20 will be dictated by the desired application of the spiral wound gasket 10 and the dimensions of the opposing surfaces that will sandwich the spiral wound gasket 10. Various embodiments will use outer guide rings 18 and inner guide rings 20 formed from 316 stainless steel. However, other materials, such as Inconel or other high temperature metallurgies may be used, depending on the desired applications and manufacturing cost limits.

Winding fill materials that are resistant to degradation at elevated temperatures are typically less likely to adhere and bind together. A sealing face may be created by winding fill material 16 being extruded from between the spirally wound metal banding 14. However, when extruded winding fill material 16 does not possess the inherent ability to adhere to form an opposing sealing face, sealing degrades. The extruded sealing face tends to be of lesser quality when using high temperature winding fill materials due to the material properties of high temperature fillers. More standard industrial filler materials, such as graphite, extrude to form an extruded sealing face that is an effective sealing surface. However, graphite is not suitable for applications of continuous temperature above 850° F. in oxidizing atmospheres, or extended temperature forays above 900° F. Accordingly, various embodiments of the spiral wound gasket include one or more layers of facing material 30. With reference to FIG. 2, a layer of facing material 30 may be secured to one or both of the axial faces 32 of the sealing element 12. In various embodiments, the layers of facing material may be secured with the axial faces 32 with binders, such as one of the various commercially available spray adhesives. However, other securement methods, including mechanical press fit and encapsulating are contemplated. In the embodiment depicted in FIG. 2, the thickness of the layers of facing material 30 is approximately 0.010 inches; however, the thickness of the layers of facing material 30 may range from about 0.004 inches to about 0.020 inches thick. The width of the layers of facing material 30 will generally be dictated by the gasket width.

Various embodiments will use layers of facing material 30 that are formed from the same material, and in the same or similar manufacturing process, as the winding fill material 16. Accordingly, in some embodiments, the layers of facing material 30 may be provided using various ratios of inorganic filler, inorganic fiber, and organic binder. Generally, embodiments of the layers of facing material 30 use talc as the inorganic filler in a range from 60% to 90% by weight. Inorganic fiber content for some such embodiments of the layers of facing material 30 is from 1% to 14% by weight. Similarly, organic binder content for embodiments of the layers of facing material 30 is from 1% to 8% by weight. Some embodiments of the layers of facing material 30 may be provided to include greater than 60% by weight talc, less than 20% by weight inorganic fiber, and less than 5% by weight organic binder. Other embodiments of the layers of facing material 30 include 75 to 90 wt % inorganic filler, 5 to 20 wt % inorganic fiber, and 1 to 5 wt % organic binder. In at least one embodiment, the layers of facing material 30 are formed to include approximately 90% by weight talc, 7% by weight inorganic fiber, and 3% by weight organic binder.

In the depicted embodiments, the layers of facing material 30 are formed as a pair of annular rings that are cut from a compressed sheet in one of various known cutting methods known in the industry. Other methods of forming, including but not limited to those described above, (such as continuous wet lay processes, extrusion molding, injection molding, discreet molding methods, and processes similar to a silk screen processes, may be used to fabricate the final form of the layers of facing material 30. In some embodiments, the layers of sealing material 30 are formed to have substantially uniform thickness and density. While the layers of facing material are depicted as being ring-shaped, the layers may be formed in nearly any shape to accommodate the axial faces 32 of the sealing element 12.

In some embodiments, the layers of facing material 30 are adhered to the axial faces 32 of the sealing element 12 using spray adhesive, or other suitable adhesives for the anticipated applications for the spiral wound gasket 10. In such embodiments, the adhesive is applied either to the layers of sealing material 30 or to the axial faces of the sealing element 12. However, in other embodiments, the layers of facing material 30 may by mechanically coupled with the axial faces of the sealing element 12 by creating a mechanical bond between the facing material and the surface of the sealing element. This can be accomplished by pressing the facing material into the axial surface of the seal to encourage the materials to mesh and weakly bond.

Figure 5:
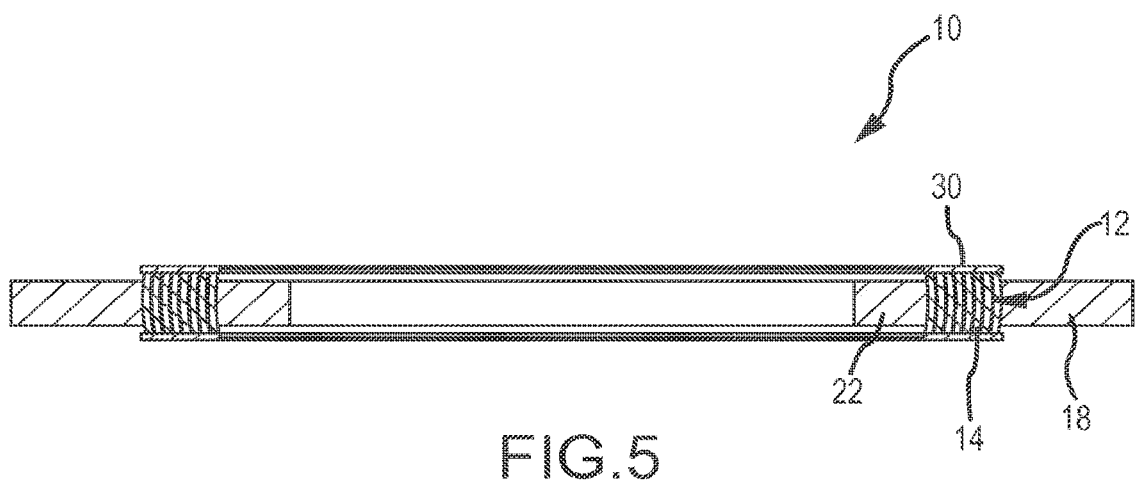
FIG. 5 depicts a cross-sectional view of another embodiment of the spiral wound gasket of the present technology, wherein no filler material is used between the metal windings of the gasket.

With reference to FIG. 5, the spiral wound gasket 10 includes a resilient sealing element 12 that includes spirally wound, alternating layers of metal banding 14 to define a resilient spiral core 15. However, no winding fill material 16 is disposed between the layers of metal banding 14. In various applications, embodiments of the spiral wound gasket 10 will include an outer guide ring 18 that extends radially outward from an outer periphery of the sealing element sealing element 12. Some embodiments of the spiral wound gasket 10 will include an inner guide ring 20 that extends radially inward from an inner periphery of the sealing element 12. It is contemplated that various applications of the spiral wound gasket may require the use of either, both, or neither of the outer guide ring 18 and the inner guide ring 20. A layer of facing material 30 may be secured to one or both of the axial faces 32 of the sealing element 12.

Figure 6:
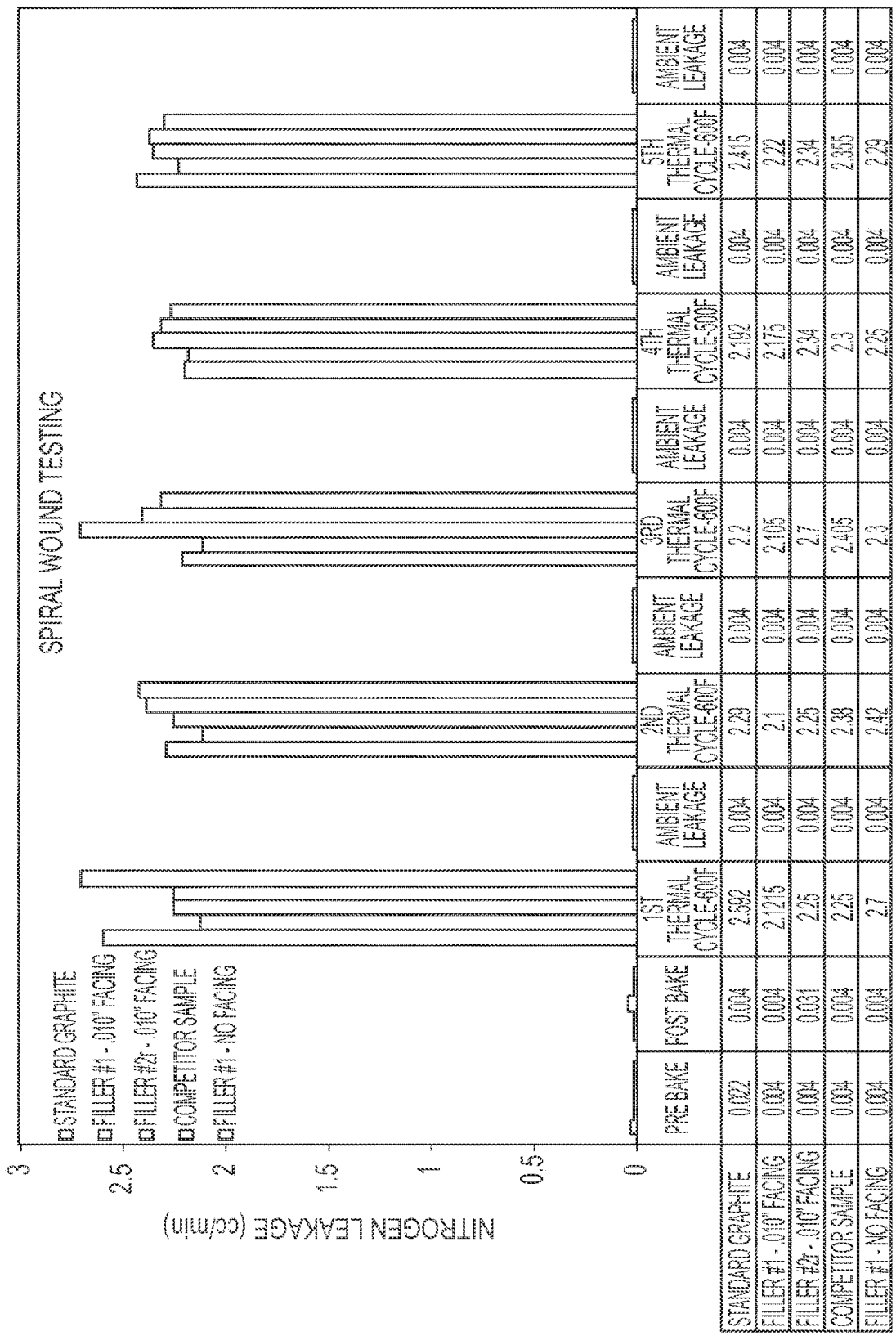
FIG. 6 depicts comparative testing data for the sealability of different spiral wound gasket at operational temperatures.

With reference to FIG. 6, comparative testing of different spiral wound gaskets was performed to determine sealability at operational temperatures of approximately 600° F. after a 24 hour 1000° F. bake. This test mimics an accepted high temperature leakage test performed by a major petrochemical entity. Specifically, test flanges were each fit with one of five different spiral wound gaskets that included different filler and facing materials. A first gasket (industry standard graphite) included standard graphite filler material. A second gasket (filler #1) used a filler material according to the present technology, which included filler material having a formulation of: talc filler, in a range from 60% to 90% by weight; a fiber, from 1% to 14% by weight; and a binder, from 1% to 8% by weight. A third gasket (filler #2) included a filler material formed from the same material used for filler #1 but is provided with a thickness of 0.04 inches, whereas the sample in filler #1 had a thickness of 0.23 inches. A fourth gasket (competitor sample) included a filler material primarily formed from vermiculite. A fifth gasket (filler #1 without facing material) used a filler material with a composition similar to the second gasket. However, the facing material was not applied. The samples were charged with Nitrogen and brought to testing temperatures (between 600° F. and 1200° F.) and Nitrogen leakage was monitored and recorded. It can be seen that the second gasket, having a talc filler material and facing, consistently outperformed the other sample gaskets. It should be appreciated, however, that operational temperatures of this gasket may exceed 1000 C and is not bounded.

Figure 7:
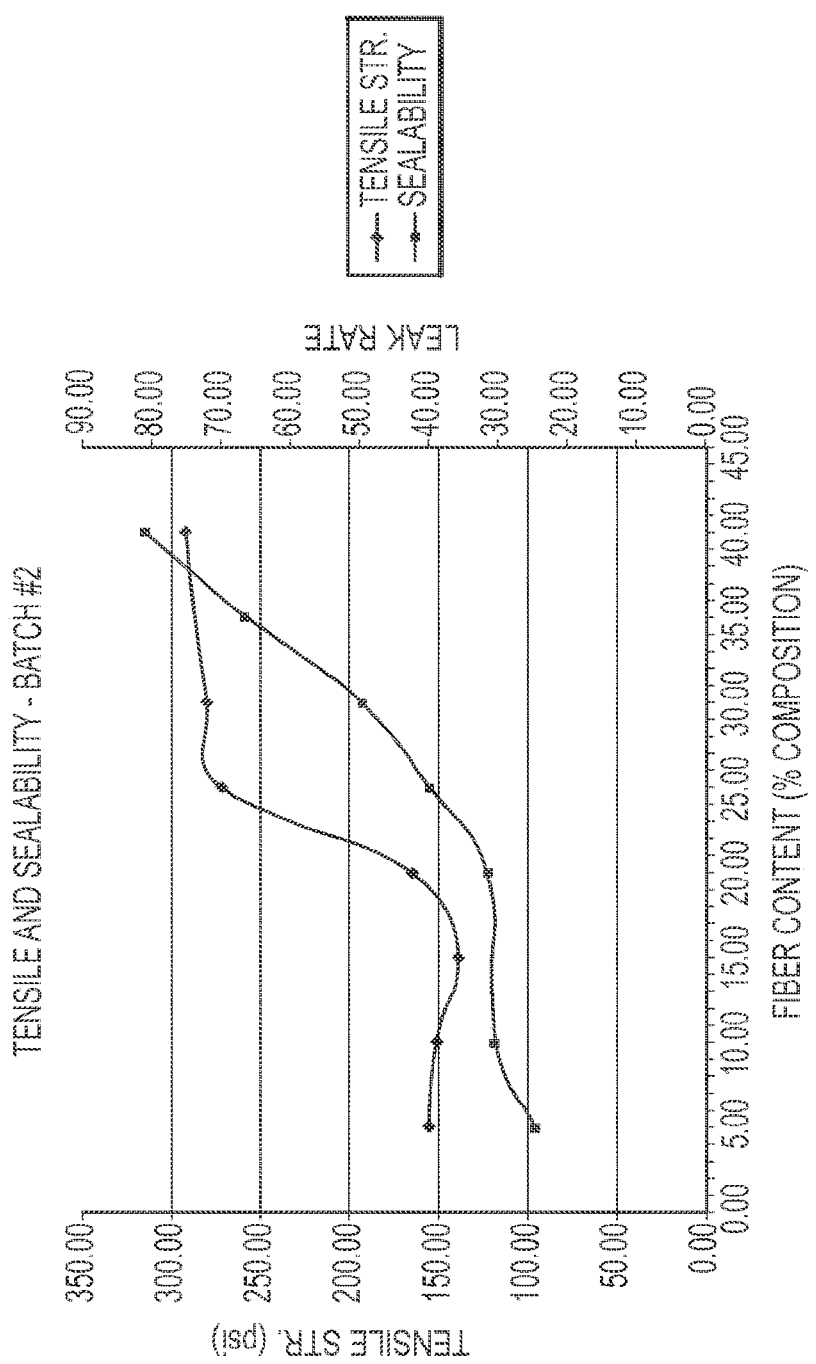
FIG. 7 depicts sample data demonstrating tensile strength and sealability, as a function of fiber content, in the formula for one embodiment of the facing material of the present technology.

With reference to FIG. 7, sample data is shown that demonstrates tensile strength and sealability as a function of fiber content in the formula for one embodiment of the facing material. In particular, it can be seen that the trend lines indicate that formulations of the facing material having 25% fiber and below equate to greater sealing quality.

Although the technology has been described in language that is specific to certain structures, materials, and methodological steps, it is to be understood that the invention defined in the appended claims is not necessarily limited to the specific structures, materials, and/or steps described. Rather, the specific aspects and steps are described as forms of implementing the claimed invention. Since many embodiments of the invention can be practiced without departing from the spirit and scope of the invention, the invention resides in the claims hereinafter appended. Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques. Moreover, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

What is claimed is:
1. A spiral wound gasket comprising:
a resilient sealing element including spirally wound, alternating layers of metal banding and winding fill material; wherein
the winding fill material comprises 75% to 90% by weight filler, 1% to 14% by weight fiber, and 1% to 3% by weight organic binder; and
wherein all of the filler included in the winding fill material is hydrophobic filler.
2. The spiral wound gasket of claim 1 further comprising:
an outer guide ring extending radially from an outer periphery of the resilient sealing element.
3. The spiral wound gasket of claim 2 further comprising:
an inner guide ring extending radially from an inner periphery of the resilient sealing element.
4. The spiral bound gasket of claim 1 wherein:
the winding fill material consists of 90% by weight filler, 7% by weight fiber, and 3% by weight organic binder.
5. The spiral wound gasket of claim 1, wherein the total amount of organic material present in the winding fill material is 5% by weight.
6. The spiral wound gasket of claim 1, wherein the length of the fibers is from 1 mm to 6 mm.
7. The spiral wound gasket of claim 1, wherein at least a portion of the hydrophobic filler is talc.
8. The spiral wound gasket of claim 1, wherein the fiber comprises silicic acid fiber.
9. A spiral wound gasket comprising:
a resilient sealing element including spirally wound, alternating layers of metal banding and winding fill material; wherein the winding fill material comprises from 75% to 90% by weight filler, 1% to 14% by weight fiber, and 1% to 3% by weight organic binder; and wherein all of the filler included in the winding fill material is talc.

10. The spiral bound gasket of claim 9 wherein:
the winding fill material consists of 90% by weight filler, 7% by weight fiber, and 3% by weight organic binder.

11. The spiral wound gasket of claim 9, wherein the total amount of organic material present in the winding fill material is 5% by weight.

12. The spiral wound gasket of claim 9, wherein the length of the fibers is from 1 mm to 6 mm.

13. The spiral wound gasket of claim 9, wherein the fiber comprises silicic acid fiber.

14. The spiral wound gasket of claim 9, wherein the talc is low particle size talc having a particle size in the range of from 0.2 microns to 1.5 microns.

* * * * *